(12) United States Patent
Gandolfo

(10) Patent No.: US 11,858,466 B2
(45) Date of Patent: Jan. 2, 2024

(54) TRUNK SHELF SYSTEM

(71) Applicant: Alexandra Castiello Gandolfo, Bethesda, MD (US)

(72) Inventor: Alexandra Castiello Gandolfo, Bethesda, MD (US)

( * ) Notice: Subject to any disclaimer, the term of this patent is extended or adjusted under 35 U.S.C. 154(b) by 0 days.

(21) Appl. No.: 17/082,085

(22) Filed: Oct. 28, 2020

(65) Prior Publication Data

US 2021/0155163 A1 May 27, 2021

Related U.S. Application Data

(60) Provisional application No. 62/938,398, filed on Nov. 21, 2019.

(51) Int. Cl.
*B60R 7/04* (2006.01)

(52) U.S. Cl.
CPC .................... *B60R 7/043* (2013.01)

(58) Field of Classification Search
CPC .. B60R 7/043; B60R 7/04; B60R 7/00; B60R 5/045; B60R 2011/0015; B60R 7/005; B60R 9/065; B60R 5/044; B60R 5/047; B60R 5/048; B60R 2011/0017; B60N 3/004; B60N 3/102; B60N 3/001; B60N 3/002
USPC ......................................................... 224/275
See application file for complete search history.

(56) References Cited

U.S. PATENT DOCUMENTS

| | | | |
|---|---|---|---|
| 2,645,392 | A | 7/1953 | Gottsegen et al. |
| 2,774,640 | A * | 12/1956 | Harmon ................ B60N 3/004 108/134 |
| 2,881,039 | A | 4/1959 | Guzman |
| 3,386,392 | A | 6/1968 | Gramm |
| 3,393,936 | A | 7/1968 | Hall |
| 3,756,481 | A | 9/1973 | Schaefer |
| 3,951,486 | A | 4/1976 | Tracy |
| 4,466,659 | A | 8/1984 | Carpentier et al. |
| 5,046,433 | A | 9/1991 | Kramer et al. |
| 5,366,124 | A | 11/1994 | Dearborn, IV |
| 5,667,115 | A | 9/1997 | Verhaeg |
| 5,685,592 | A | 11/1997 | Heinz |
| 5,931,527 | A | 8/1999 | D'Onofrio et al. |
| 6,092,708 | A | 7/2000 | Rand |

(Continued)

FOREIGN PATENT DOCUMENTS

| | | | | |
|---|---|---|---|---|
| CN | 104723977 | A | * 6/2015 | ......... B60R 11/0252 |
| DE | 102006061843 | A1 | * 6/2008 | ............. B60R 5/006 |
| WO | WO 03/026916 | A2 | 4/2003 | |

OTHER PUBLICATIONS

CN 104723977 A Translation, Lin, Jun. 2015 (Year: 2015).*

(Continued)

*Primary Examiner* — Nathan J Newhouse
*Assistant Examiner* — Matthew T Theis
(74) *Attorney, Agent, or Firm* — Nixon & Vanderhye P.C.

(57) ABSTRACT

A trunk shelf system for mounting onto a seat back of a vehicle includes a support structure configured to be secured to the seat back; and a shelf movably mounted to the support structure, the shelf being movable between a stowed position and a deployed position, the shelf having a bottom surface providing a primary support surface and a supplemental support surface that is movable from a retracted position to an extended position when the shelf is in the deployed position.

21 Claims, 14 Drawing Sheets

(56) References Cited

U.S. PATENT DOCUMENTS

| | | | |
|---|---|---|---|
| 6,105,839 | A | 8/2000 | Bell |
| 6,405,909 | B1 | 6/2002 | Burnett et al. |
| 6,607,241 | B2 | 8/2003 | Johnston |
| 6,874,667 | B2 | 4/2005 | Dykstra et al. |
| 7,350,681 | B2* | 4/2008 | Polburn .................. B60R 7/005 296/37.16 |
| 7,658,153 | B1 | 2/2010 | Patoka |
| 7,708,329 | B2 | 5/2010 | Duller |
| 7,806,453 | B2 | 10/2010 | Aebker |
| 8,814,245 | B1 | 8/2014 | Welch et al. |
| 8,876,184 | B2 | 11/2014 | Lucas |
| 10,239,460 | B2 | 3/2019 | Hotio |
| 10,300,861 | B1 | 5/2019 | Green et al. |
| 10,336,261 | B2 | 7/2019 | White et al. |
| 2005/0134075 | A1 | 6/2005 | Kim |
| 2005/0218172 | A1 | 10/2005 | Hassett |
| 2010/0275818 | A1 | 11/2010 | Ellis |
| 2011/0215122 | A1 | 9/2011 | Osborne |
| 2016/0288723 | A1 | 10/2016 | Woodhouse et al. |
| 2017/0303701 | A1* | 10/2017 | Degon .................. A47D 5/006 |
| 2019/0029217 | A1* | 1/2019 | Ryan .................... A01K 1/0353 |

OTHER PUBLICATIONS

Amazon, https://www.amazon.com/Backseat-Trunk-Organizer-SUV-Car/dp/B07MLH738V/ref, downloaded Oct. 27, 2020, 11 pages, date unknown.

Amazon, https://www.amazon.com/Organizer-Organizers-Collapsible-Accessories-Organize/dp/B07NQ6JHN5?source=ps-sl-shoppingads-lpcontext&psc=1, downloaded Oct. 27, 2020, 8 pages, date unknown.

Amazon, AMEIQ Car Trunk Organizer, Elastic Cargo Nets Bag, Seat Back Mesh Storage, Hanging Netting Holder for Toys Tools Cloth Groceries, Fit for Most SUVs, downloaded Oct. 27, 2020, 8 pages, date unknown.

Amazon, YOUMILE Car Trunk Organizer Storage for SUV, Collapsible Cargo Storage, Portable Multi Compartments Trunk Organizer with Securing Straps and Net, Black, downloaded Oct. 27, 2020, 8 pages, date unknown.

Amazon, Home Innovation Trunk Organizer for SUV Car, Truck, Auto, Minivan—4 Adjustable Compartments Foldable Portable Trunk Organizer, Heavy Duty Durable Car Organizer, Removable Flexible Cargo Storage Bag, downloaded Oct. 27, 2020, 10 pages, date unknown .

Walmart.com, Best Choice Products 60×20in Folding Cargo Carrier Basket Rack for Car, Truck, Trailer w/ 2in Receiver, Steel Frame, downloaded Oct. 27, 2020, 4 pages, date unknown.

Amazon, Lebogner Back Seat Trunk Organizer, 5 Pocket Space Saving Car Organizer, Auto Trunk Organizer, Backseat Hanging Storage Organizer, Multipurpose Cargo Accessories Under Seat Organizer, Adjustable Strap, downloaded Oct. 27, 2020, 10 pages, date unknown.

Macy's, J.L. Childress Double Cargo Double Stroller Organizer, downloaded Oct. 27, 2020, 1 page, date unknown.

Amazon, Fortem Car Trunk Organizer, Foldable Cover, Non-Slip Waterproof Bottom, Straps, Cargo Storage (2 Compartments, Black), downloaded Oct. 27, 2020, 8 pages, date unknown .

Amazon, SUAOKI Backseat Car Trunk Organizer Foldable Cargo Storage Bag with Adjustable Strap, Durable Cover, Washable, Best for SUV, Vehicle, Auto, Minivan(Black), downloaded Oct. 27, 2020, 11 pages, date unknown.

Written Opinion and International Search Report dated Oct. 3, 2023 in related International Application No. PCT/US23/68928, 21 pages.

* cited by examiner

TRUNK SHELF SYSTEM

CROSS-REFERENCE TO RELATED APPLICATION

This application claims the benefit of U.S. Provisional Application No. 62/938,398, filed Nov. 21, 2019, and is incorporated herein by reference in its entirety.

BACKGROUND & SUMMARY

The present technology relates generally to a stowable trunk shelf system for an automobile, such as a sports utility vehicle (SUV) and/or a cross over vehicle (CUV).

Currently there are a number of solutions for SUV and CUV cargo space organization. Some of these solutions attempt to compartmentalize or subdivide an SUV or CUV's cargo space but these solutions fail to meet the needs of the industry.

One aspect of the present technology is a repositionable shelf for an SUV or CUV trunk that allows users to take advantage of the height of the cargo space from the base of the trunk to the bottom of the rearmost head restraints.

Another aspect of the present technology is to have a restraining bar that runs around the perimeter of the shelf that keeps items placed on top of the shelf from falling over in transit.

Another aspect of the present technology is for the restraining bar to extend upward in height via telescoping rods. Once extended, the retraining bar locks firmly into place.

Another aspect of the present technology is to have a cargo netting enclosure on top of the shelf that hooks into the retraining bar that keeps items placed on top of the shelf from falling over in transit.

Yet another aspect of the present technology is to have vertical dividers on the shelf that sub-divide the shelf length and allow users to keep smaller items (such as grocery bags) firmly in place in transit. These dividers can fold down/collapse onto the base of the shelf or they can detach entirely so that the user can subdivide the length of the shelf as necessary.

Yet another aspect of the present technology is to enable the trunk shelf to collapse or stow while not in use.

Another aspect of the present technology is directed to an angle adjuster that allows users to adjust the angle of the trunk shelf, because not all seatbacks are positioned at the same angle relative to the trunk floor. The user sets the angle at which the shelf meets the seatback via the angle adjuster, e.g., pin and slot mechanism and/or bearing mechanism.

Another aspect of the present technology is a built-in level that shows users when the shelf is at the desired angle with the specific seat backs. This helps the user set the angle for the shelf based on the precise angle of his or her seatback and provides for horizontal positioning of the shelf.

Another aspect of the present technology is to allow the user to set the angle of the shelf 1 via an angle adjuster that need only be set one time for any particular vehicle (e.g., "set and forget").

Another aspect of the present technology is that it installs quickly and easily via an adjustable belt system that loops around the seatback itself and/or at least one of the seatback headrests. No tools or hardware are needed to install this technology into an SUV or CUV.

Another aspect of the present technology is that it installs on almost any SUV or CUV; it is nearly universal in its fit.

Another aspect of the present technology is a detachable track system that, when attached to the repositionable shelf, allows users to pull the shelf forward to the mouth or opening of the trunk.

Another aspect of the present technology is a set of releasable locking pins that allows users to detach the shelf from the support structure so that the shelf can slide forward via the track system, when installed.

Another aspect of the present technology is detachable and collapsible telescoping legs. The legs will provide additional structural support when very heavy items are placed on the shelf. Additionally, the legs will provide additional structural support when the repositionable shelf is extended forward by means of the attachable track system.

One aspect of the present disclosure is directed to a trunk shelf system comprising a movable shelf, a support structure, or hard plastic backing that rests against the back of the seat on which it is installed, and at least one angle adjuster to set the angle of the shelf relative to the support structure.

The angle adjusters may be a pin and slot arrangement and/or a dual bearing. The pin and slot arrangement may include locking hinges or links to accommodate different seatback angles.

The trunk shelf system may include a restraining bar that runs along the sides and front of the shelf and is extendable in height, a detachable sturdy cargo netting that extends over top of the shelf and hooks onto the restraining bar, collapsible or detachable horizontal shelf dividers that sit on top of the shelf for subdivision of the shelf's length, and/or a sturdy belt system, including at least one belt, that attaches the shelf to the rearmost seatback headrests and/or seatback itself. This belt system allows users to install the trunk shelf system with no tools or hardware.

Further, the trunk shelf system may feature a detachable track system that allows users to pull the repositionable shelf forward to the opening of the trunk.

The trunk shelf system also may also feature a set of detachable and collapsible legs that are height adjustable. When in use, the legs extend and meet the floor of the trunk to offer additional structural support for the repositionable shelf.

The trunk shelf system may be stowed while not in use. That is, the multi angle folding links or hinges holding the shelf in an upright position collapse or fold so that the shelf can stow and lay flat against the back of the seatback while not in use.

The device may also have one or more of the following:
  Customizable "skin," cover, or design for the underside of the shelf with user's monogram, college or pro team logo, company name, etc. When stowed, the shelf would prominently display this logo or design. This same customizable skin or cover can be placed on the top of the shelf, too. When the detachable track system is in place to allow the shelf to move forward to the opening of the trunk, the top of the shelf's design or logo would be prominently displayed.
  A holder or receptacle for storing umbrellas that hooks onto the shelf;
  Pockets made of mesh or other lightweight material that attach to either of the shelf's sides to offer additional storage space;
  Pockets made of mesh or other lightweight material that attach to the front of the shelf to offer additional storage space;
  Cooler that hooks on to the top or onto the bottom of the shelf for storing cold items such as perishable groceries, water, etc.;

Detachable or collapsible horizontal dividers that hook onto the bottom of shelf to offer sub-division of space underneath the shelf;

Hooks that attach anywhere along the perimeter of the shelf restraining bar to offer hanging capability;

Cup holders that attach to the front edge of the trunk shelf.

An aspect of the present technology is directed to a trunk shelf system for mounting onto a seat back of a vehicle, the system comprising a support structure configured to be secured to the seat back; and a shelf movably mounted to the support structure, the shelf being movable between a stowed position and a deployed position, the shelf having a bottom surface providing a primary support surface and a supplemental support surface that is movable from a retracted position to an extended position when the shelf is in the deployed position.

Another aspect of the present technology is directed to trunk shelf system for mounting onto a seat back on a vehicle, the system comprising a support structure configured to be secured to the seat back, the support structure including a sliding rod; a shelf movably mounted to the support structure, the shelf including a rear rail and being movable between a stowed position and a deployed position; and a dual bearing system having a rotary bearing and a sliding bearing fixed in relation to one another, the rotary bearing rotatably supporting the rear rail to allow angular adjustment of the shelf and the sliding bearing being slidable along the sliding rod to allow for height adjustment of the shelf.

The disclosed systems may provide for subdivision of the height of an SUV or CUV's cargo space. The shelf provides a large surface where users can place and store items securely above the trunk's floor, freeing up floor space for larger items such as strollers, coolers, and folding chairs. Further, the trunk shelf system offers a substantially universal fit; the device is installed onto the seatback of an SUV or CUV trunk via an intuitive system, e.g., one or more belts that requires no tools or hardware. This system is sturdy and secure, providing for one or more, e.g., three, separate attachment points of the shelf to almost any SUV or CUV. In examples, the system is unique due to the presence of one or more of the following: (1) a repositionable shelf that attaches via a belt system to an SUV or CUV's rear seatback head restraints; (2) one or more adjustable angle folding hinges or links to accommodate almost any angle of rear seatback to which the shelf is attached allowing the shelf to open and lay flat; (3) ability to collapse or stow the shelf against the seat on which it's installed when not in use; (4) sturdy cargo netting that attaches to the restraining bar that runs along the perimeter of the repositionable shelf and extends over top of the shelf; (5) horizontal shelf divider functionality on the shelf to allow users to subdivide the horizontal space of the shelf itself if necessary (these shelf dividers can collapse down onto the floor of the shelf, retractor detach altogether); (6) a restraining bar that runs around at least a portion of the perimeter of the shelf and can be extended upward via telescoping rods or sliders (once extended, the restraining bar locks into place).; (7) A detachable track system that, when in use, allows the user to pull the repositionable shelf all the way forward to the opening of the trunk; . (8) A set of detachable and collapsible legs on the underside of the shelf that when extended, are height adjustable, sit on the base of the trunk floor offering the repositionable shelf an extra level of support. (9) The top and bottom of the shelf can feature a logo or design customizable by the user. The system may include one or more additional features that allow users to customize the system to their individual wants and needs.

This disclosure will now provide a more detailed and specific description that will refer to the accompanying drawings. The drawings and specific descriptions of the drawings, as well as any specific or alternative examples discussed, are intended to be read in conjunction with the entirety of this disclosure. The trunk shelf system may, however, be embodied in many different forms and should not be construed as being limited to the examples set forth herein; rather, these examples are provided by way of illustration only and so that this disclosure will be thorough, complete and fully convey understanding to those skilled in the art. Moreover, one or more features of one example may be used in conjunction with any and all of the alternate examples.

DETAILED DESCRIPTION OF EXAMPLE NON-LIMITING EXAMPLES

The present technology is directed to a trunk shelf system for SUVs and CUVs. The system includes a repositionable shelf that can be selectively and repeatedly moved between deployed position (see, e.g., FIG. 1) in which the shelf 1 is substantially horizontal and/or parallel to the trunk's floor, and a stowed position substantially parallel with the seatback when not in use (see, e.g., FIG. 3).

One example of the system includes a shelf 1, which may be made of a durable hard plastic that is optionally reinforced. A shelf liner 2, e.g., made of rubber, may be placed to cover at least a portion or the entirety of the shelf 1. The shelf is connected to a rear support structure 11, and at least one link 3 may be provided to connect the shelf 1 with a support bar of the support structure.

Adjustable Shelf

The shelf 1 may be adjustable to allow the user to select the angle of the shelf when in the deployed position. The angle may be selected to be parallel to the vehicle's floor, but it also may be selected to be inclined towards or away from the rear seat (or up or down compared to the horizontal position), depending on user preference.

Slot and Pin

Figure 3:
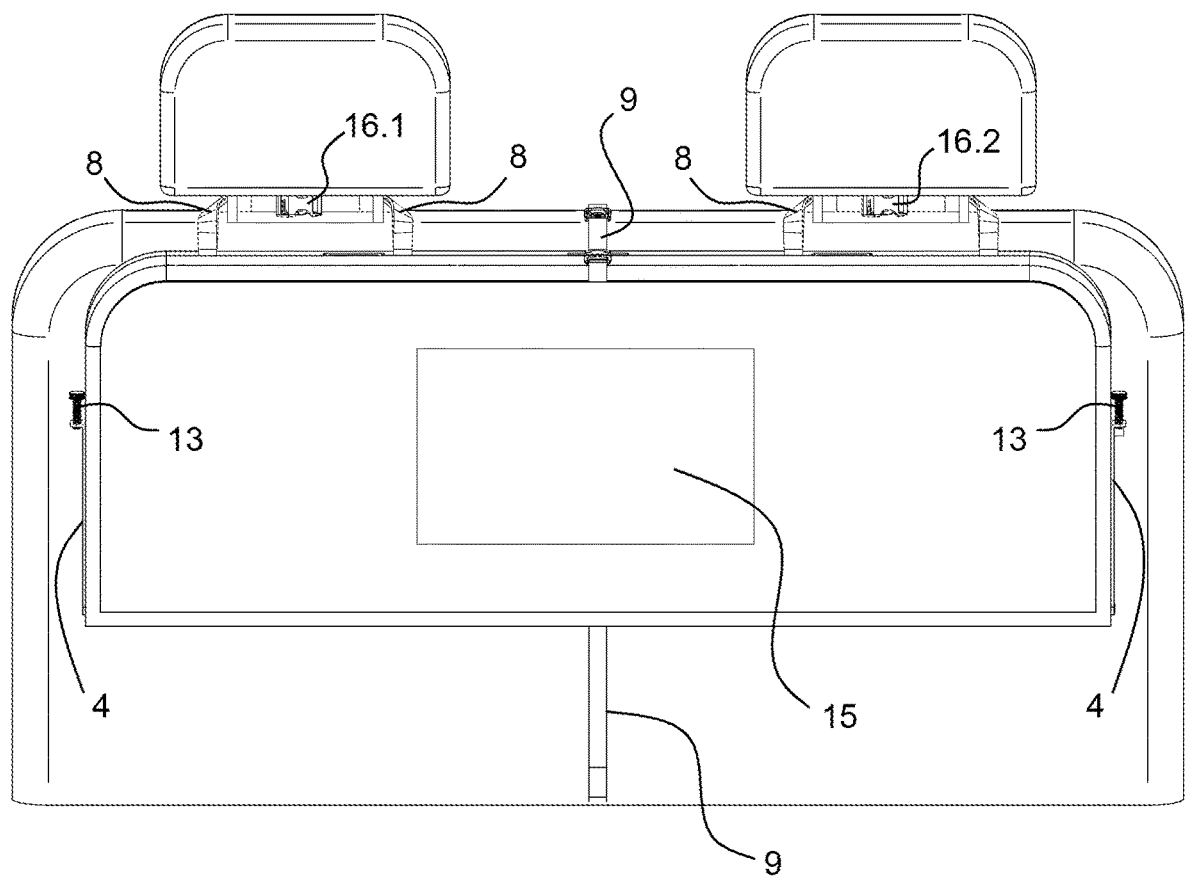
FIG. 3 is a frontal view of the trunk shelf system stowed according to an aspect of the present technology.

A slot and pin mechanism 4 may be provided to effect displacement of the system, e.g., to change the angle of the shelf 1 once set in the deployed position. The support structure is connected to the repositionable shelf 1 by way of at least one pin and slot mechanism. At least one slot 4 is located in the bottom of the support structure 11 and is associated with at least one pin P located on the rear of the shelf 1. The slot 4 and pin P allows the shelf 1 to ride vertically along the length of the support structure 11. This provides for a resulting linear displacement motion. One or more links 3 connect the top of the support structure 11 with the middle of the repositionable shelf 1. Each end of the link 3 is pinned to allow rotation of the linkage relative to the support structure, and rotation of the link to the shelf This provides for a resulting rotation motion. When extended, the shelf 1 rotates to the deployed position and raises vertically from FIG. 1 to the position shown in FIGS. 3 and 8. When stowed, the shelf 1 rotates to a stowed position as shown in FIG. 3. To stow, the user pushes and/or raises the shelf towards the seatback to collapse the shelf.

Figure 4:
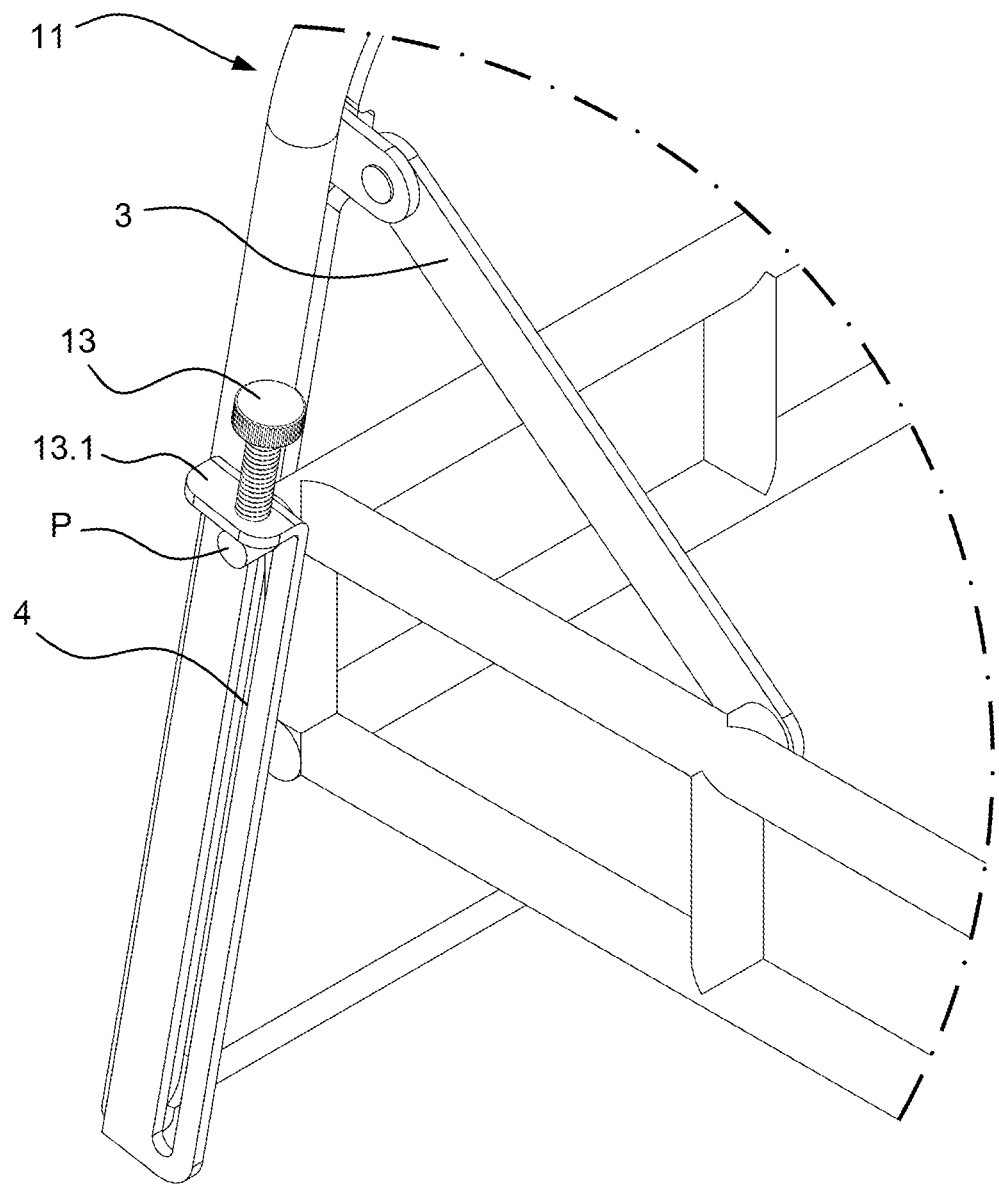
FIG. 4 is an adjuster mechanism according to an aspect of the present technology.

The angle of the shelf 1 relative to the support structure is adjustable via an adjuster 13 such as a knob or wheel. When first installing the system, the user turns the adjustor 13 when the trunk shelf 1 is extended in order to adjust the shelf so that it is parallel to the vehicle floor. Said another way, the adjuster allows the user to find the precise angle at which the shelf should be positioned and held via the link 3 to allow the shelf to be in a horizontal position. The adjuster 13 may be a bolt with a knurled end for gripping by the user and another end that may be received within a threaded hole provided on a flange 13.1, as shown in FIG. 4.

At least one level indicator 5, e.g., a vial type "bubble" level mostly filled with liquid and including a bubble, may be provided to indicate whether the shelf is level. For example, level indicator 5 may be provided on each lateral side of the shelf 1 with a top-read center vial level bubble. The indicator 5 assists the user in finding the correct angle, which may be horizontal but it also may be slightly inclined towards the seatback to keep any items on the shelf in place, especially during operation of the vehicle. Once determined, the user sets that angle via the adjuster m 13. Thus, after the shelf 1 is stowed, the user can open the shelf to the desired position without having to re-establish the already selected angle. In this way, the system allows users to "set and forget" the desired angle for their specific seatbacks.

Height and/or Rotary Adjustment

Figure 10:
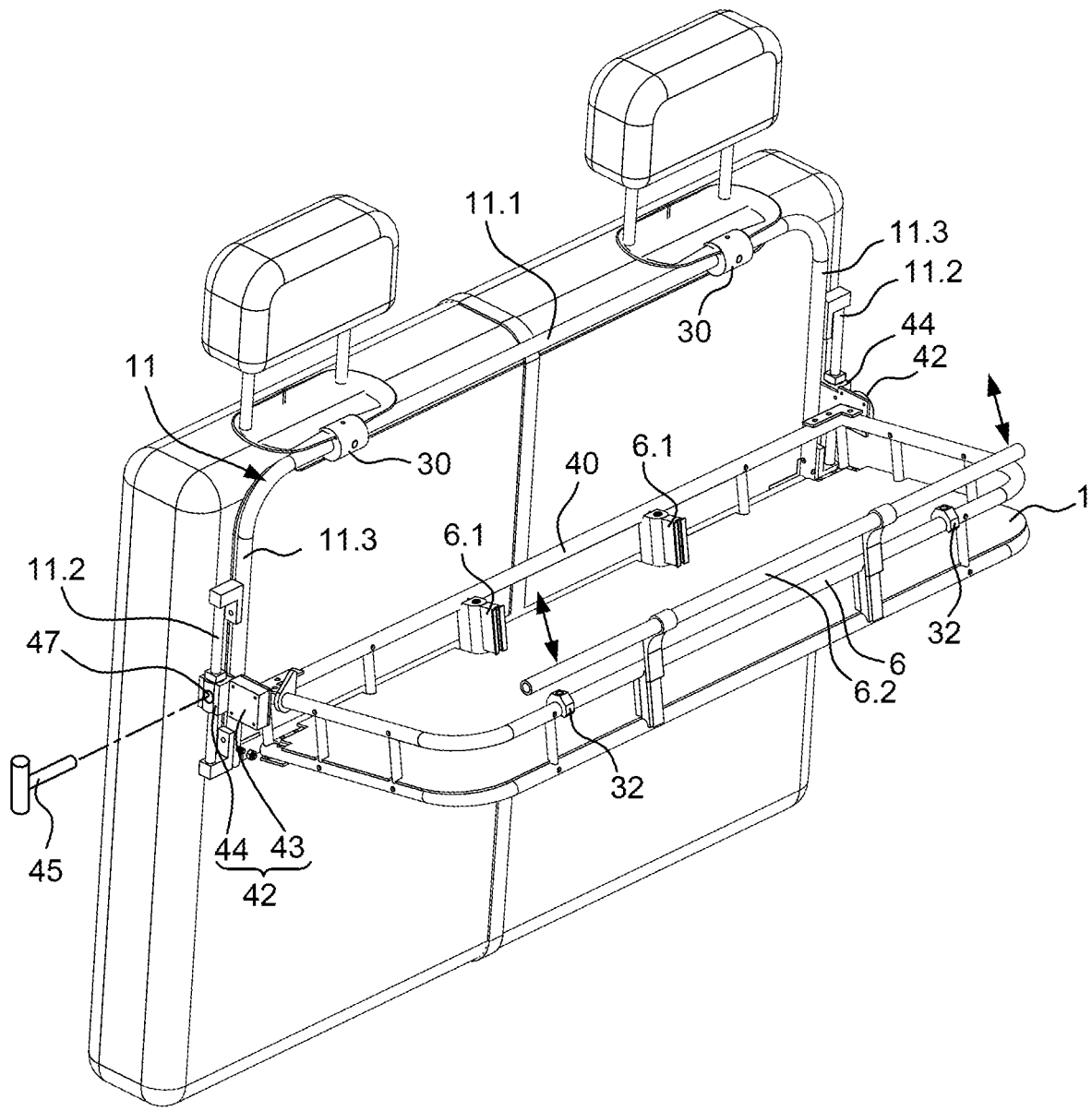
FIG. 10 is a front perspective view of a shelf system according to another example of the present technology.

As shown in FIG. 10, the shelf 1 includes a rear rail 40 that is supported at each end with a bearing 42. Bearing 42 may include a rotary bearing 43 or any type that supports the rear rail 40 to allow the shelf 1 to pivot, slide or otherwise articulate and/or move between the deployed and stowed positions. For example, rotary bearing 43 may have an inner race to which the rail 40 is fixed, and an outer race with a plurality of ball bearings between the inner and outer races.

Bearing 42 may further include a slide bearing 44 (e.g., available from Igus) that slides along a sliding rod 11.2 attached to the rear support structure 11, e.g., along lateral arms 11.3 of the rear support structure. Slide bearing may be fixed in relation to rotary bearing, to in effect create a dual bearing. In an alternative, bearing 44 may also slide along the lateral arms 11.3, thus possibly eliminating the need for separate rods 11.2. By sliding the slide bearing 44 up and down, the vertical height of the shelf 1 may be adjusted.

The slide bearing 44 may be moved between upper and lower ends of the sliding rod 11.2. As shown in FIG. 10 (deployed position), the slide bearing 44 is set in an intermediate position between the ends of the sliding rod 11.2. By contrast, FIG. 11 (the stowed position) shows the slide bearing 44 being positioned close to the lower end of the sliding rod 11.2, thus allowing for the shelf 1 to be placed in a lower or the lowest position. To set the height of the shelf in FIGS. 10-12, the shelf 1 is lowered to the desired height position via the slide bearing 44 at which point a set screw or pin 45 inserted into a hole 47 on the slide bearing 44. The hole 47 may also be in a nut that is positioned just above the slide bearing 44. In the case of a set pin, the sliding rod 11.2 or the lateral arms 11.3 may include a series of holes to receive the pin. In the case of a set screw, the tip of the screw may fixedly engage with the sliding rod 11.2 or the lateral arms 11.3 (without the need to provide holes in the rods/arms).

Once the position of the sliding bearing 44 is set into place, there is no reason to change its position unless the user desires the shelf height to be changed.

Moreover, with the slide bearing 44 set in place, the rear rail 40 is still able to rotate between the deployed and stowed positions, due to the rotary bearing 43 permitting this movement. In one example, the angle of the shelf 1 can be relatively static such that the shelf 1 simply drops to the deployed position via gravity, with the rear of the shelf abutting against the seat back and/or the support structure 11. In another example, the rotary bearing 43 may be configured to allow the angle of the shelf 1 to be changed independent of the height of the shelf dictated by the position of the slide bearing 44. In order to set the rotary position of the shelf 1, the rear rail 40 is rotated to the desired angular position, and that rotary position may be set using a setting device, such as a set pin or screw. In another example, the back rail of the shelf might include one or more bumpers 55 (FIG. 12) that may engage the support structure 11 (e.g., lower rail or portion thereof) and/or the seat back. The bumper 55 may be adjustable (e.g., rotatable on a thread or slidable on a rod) in order that the angle of the shelf 1 is adjustable. In yet another example, a simple screw adjustment extends from the back of the shelf and presses against the tubing (e.g., of the support structure 11) of the back wall on the back of the chair or seat back.

In an example, the bumper 55 may be adjustable from the front of the shelf 1 (in addition to or as a substitute for the rear adjustment), by including an adjustment knob or handle that protrudes from the front of the shelf and thus is more easily accessible while the shelf is in the deployed position. Such knob or handle may be associated or connected with a threaded bolt or telescoping member that extends from the knob at the front of the shelf to the bumper 55 at the back. The bumper may include a spring loaded head that allows some flexibility to deal with bumps, like a shock absorber. The bumper may be made of an absorbing material and/or a separate spring (e.g., coil spring) may be provided.

Cargo Netting

Figure 7:
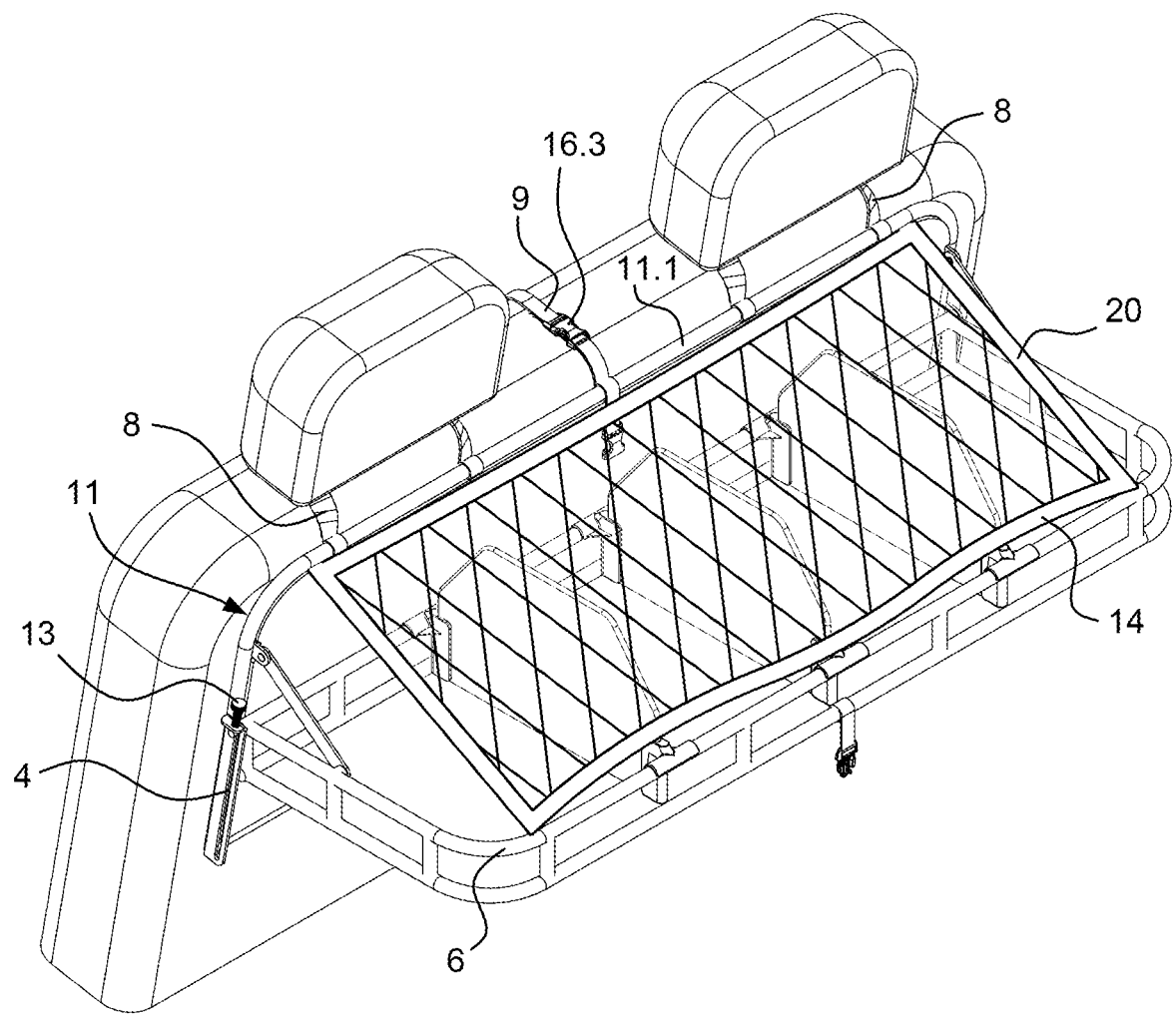
FIG. 7 is a cargo net hooked onto retraining bar according to an aspect of the present technology.

The system may include detachable sturdy cargo netting 20 that extends over top of the shelf, as shown in FIG. 7.

Figure 2:
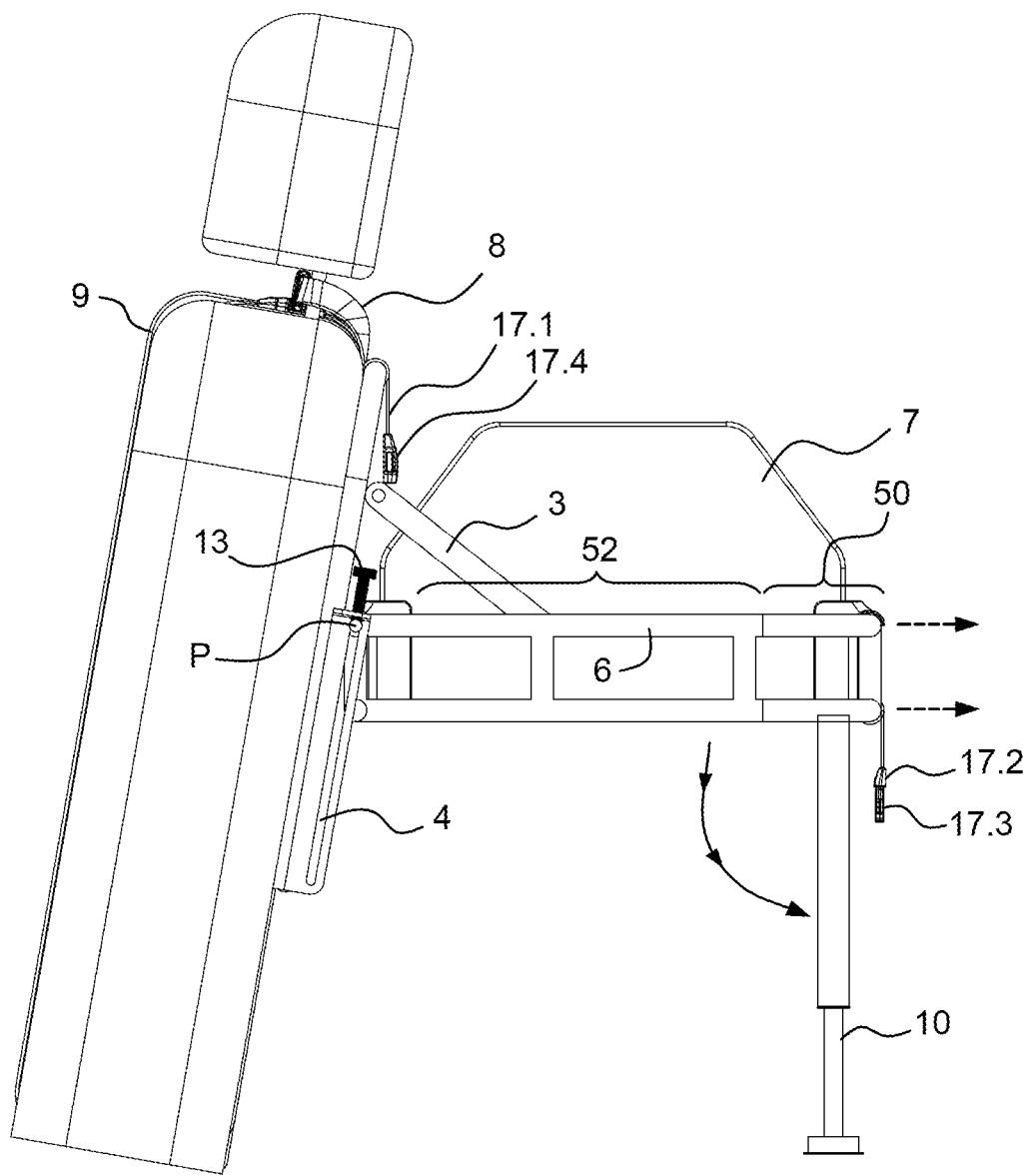
FIG. 2 is a side view of the trunk shelf system according to an aspect of the present technology.
Figure 2A:
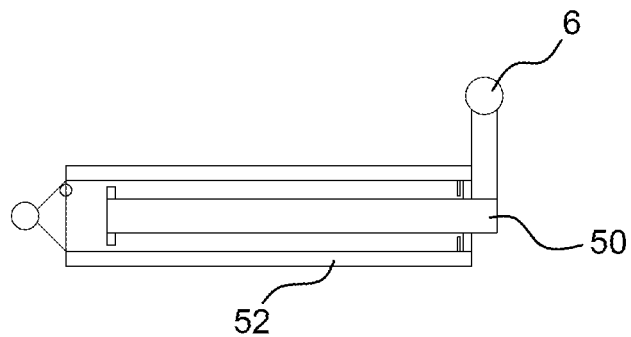
FIGS. 2A and 2B show an extendable shelf according to an aspect of the present technology.
Figure 2B:
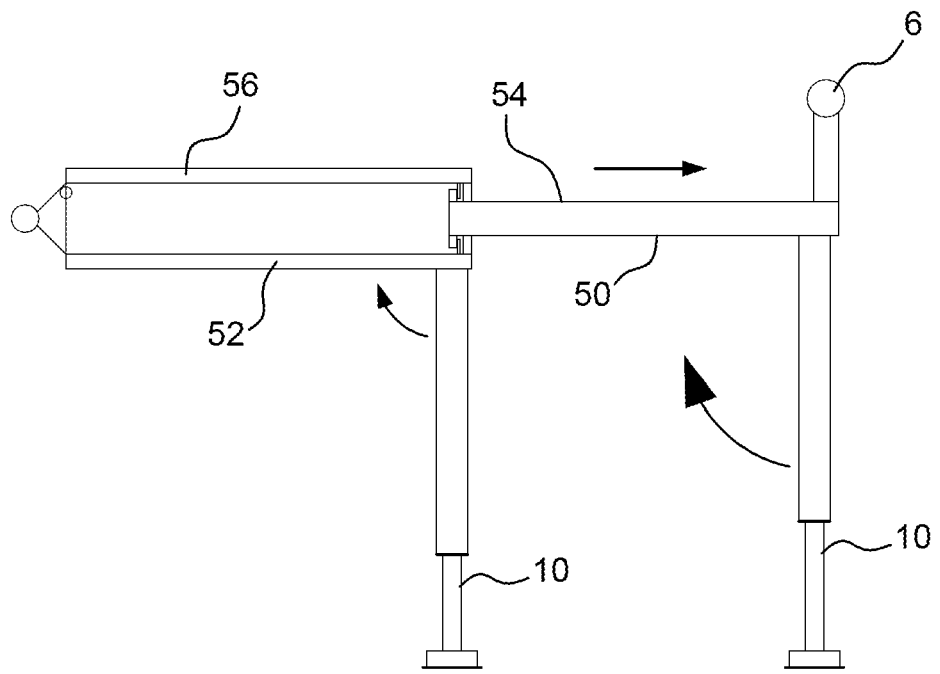

The netting 20 can be attached to the shelf 1 to prevent cargo from falling off the shelf 1. The stretchable cargo net attaches via a one or more hooks to the restraining bar 6 that runs along the perimeter. The cargo net 20 also attaches to the top bar 11.1 of the support structure 11 that attaches to the seatback. Netting 20 may be stretchable from the position shown in FIG. 7 to a position in which the shelf 1 is extended, as shown in FIG. 2B. Netting may also function to help support the shelf 1 in case of heavy cargo.

Restraining Bar

One or more sturdy (rigid or semi-rigid) restraining bars 6 may extend along at least a perimeter of the shelf 1. The restraining bar 6, or a portion thereof, may be height adjustable (e.g., sliding, telescoping, or articulated joint) to provide further lateral support of taller and/or unstable items that may be stored on the shelf 1. See, e.g., FIG. 1, where the double arrows are intended to indicate that the bar 6 can be selectively raised and lowered.

The restraining bar 6 may be made of metal, aluminum, plastic or any other lightweight study material extends at least partly around the perimeter of the shelf 1. The restraining bar 6 prevents cargo from falling off the shelf. In an example, the restraining bar 6 extends upward via telescoping rods when there is the need to contain larger items such as grocery bags. The bar 6 then locks into place at the extended height, e.g., similar to the handle on a rolling suitcase. A push-button may be provided to allow the restraining bar 6 to be moved to the lower position.

Figure 11:
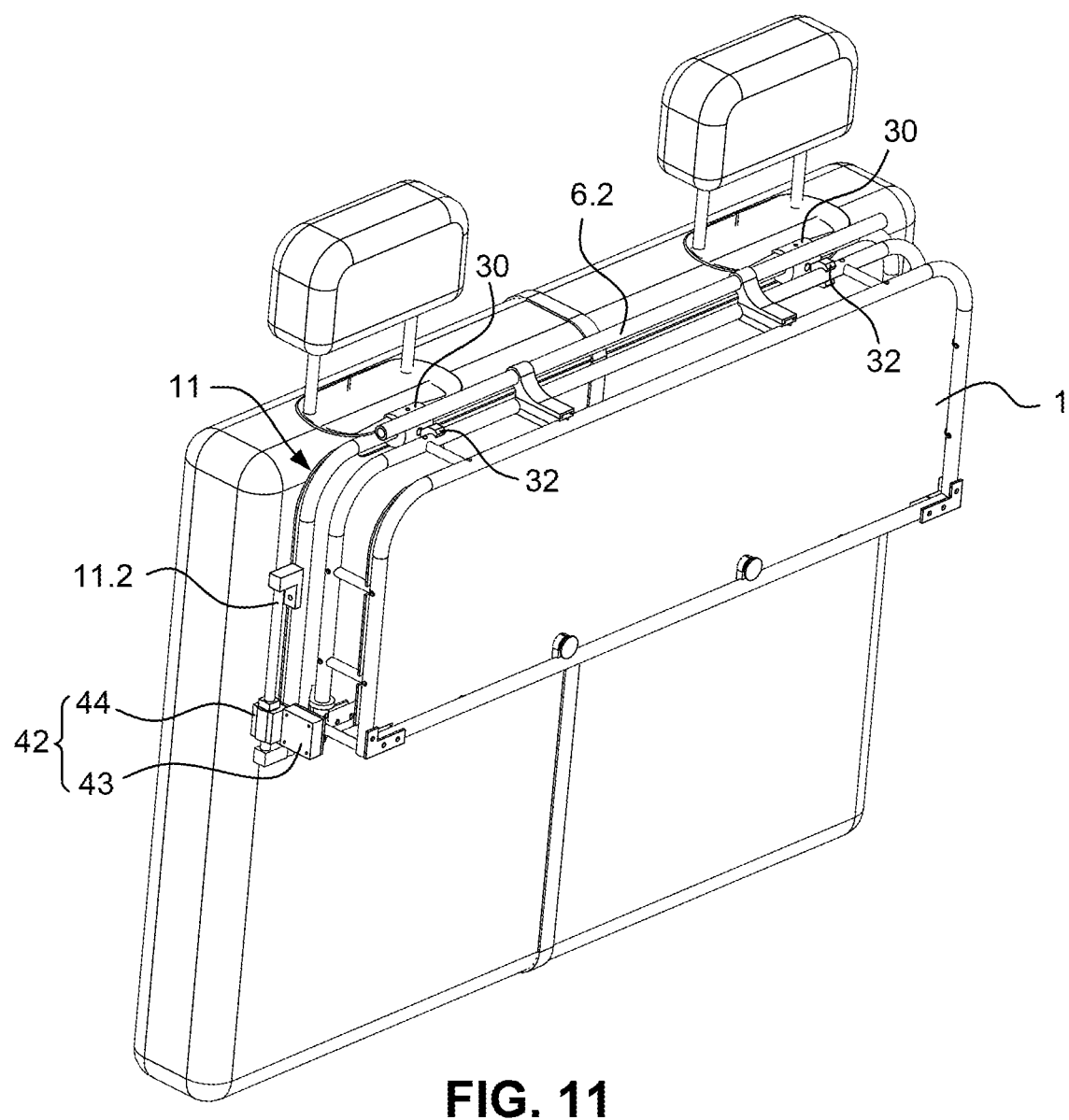
FIG. 11 is another front perspective view showing the shelf system in the stowed position.
Figure 12:
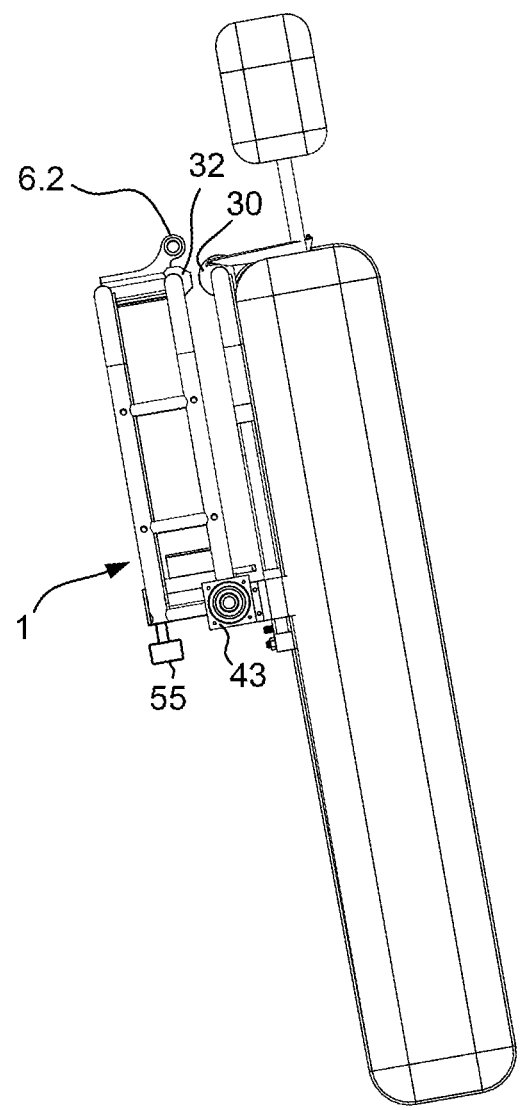
FIG. 12 is a side view showing the shelf system in the stowed position.

As shown in FIG. 10, the shelf includes a lower restraining bar 6 that may be fixed, and another restraining bar 6.2 that may be movable (e.g., telescoping, etc.) between lowered and raised positions. As shown in FIGS. 11-12, when the shelf 1 is in the stowed position, the restraining bar 6.2 is positioned to be above or offset from the top bar 11.1 of the support structure, thus avoiding interference and allowing the magnets 30 and 32 to engage.

Dividers

Figure 1:
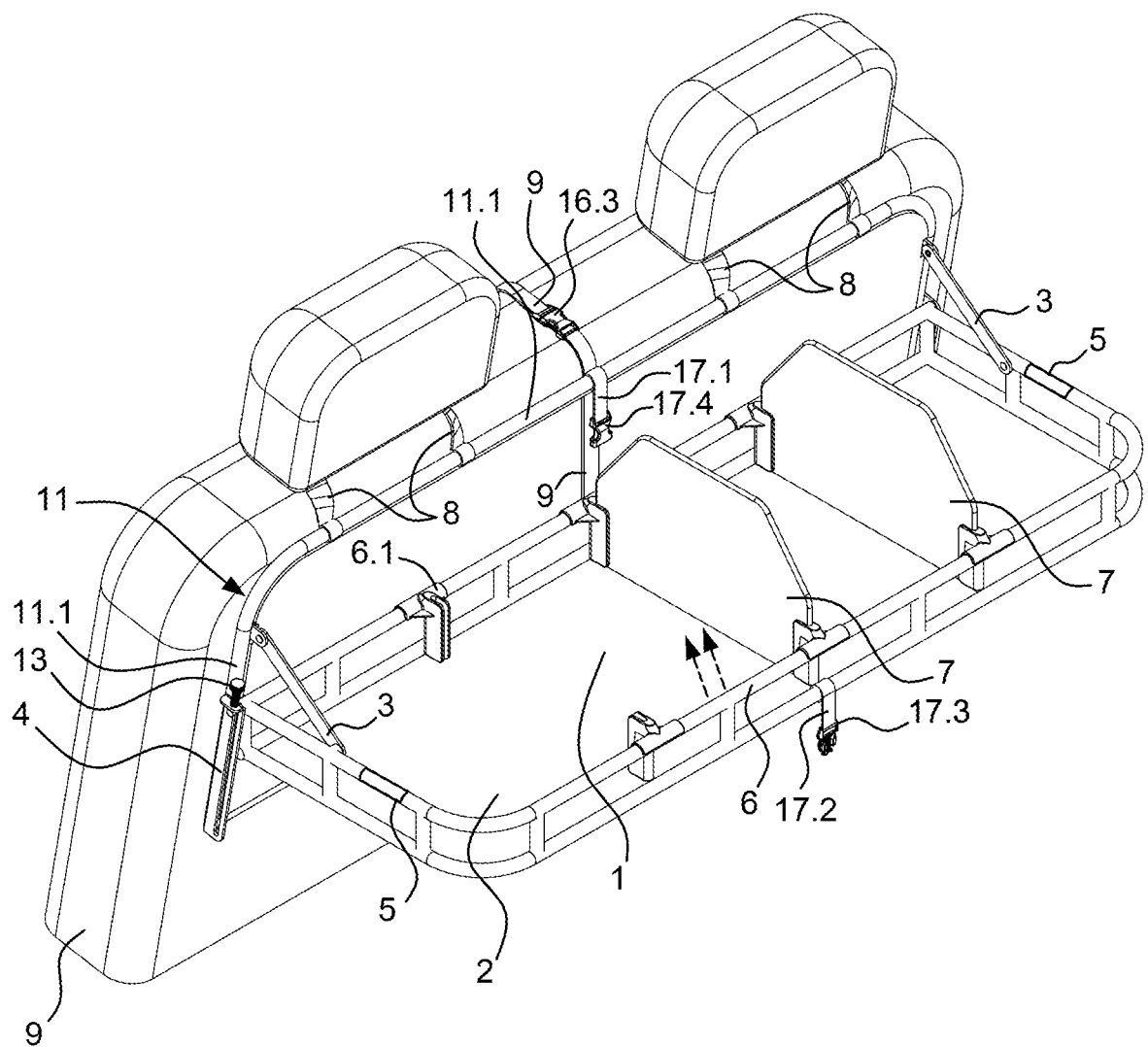
FIG. 1 is a perspective view of a trunk shelf system according to an aspect of the present technology.
Figure 5:
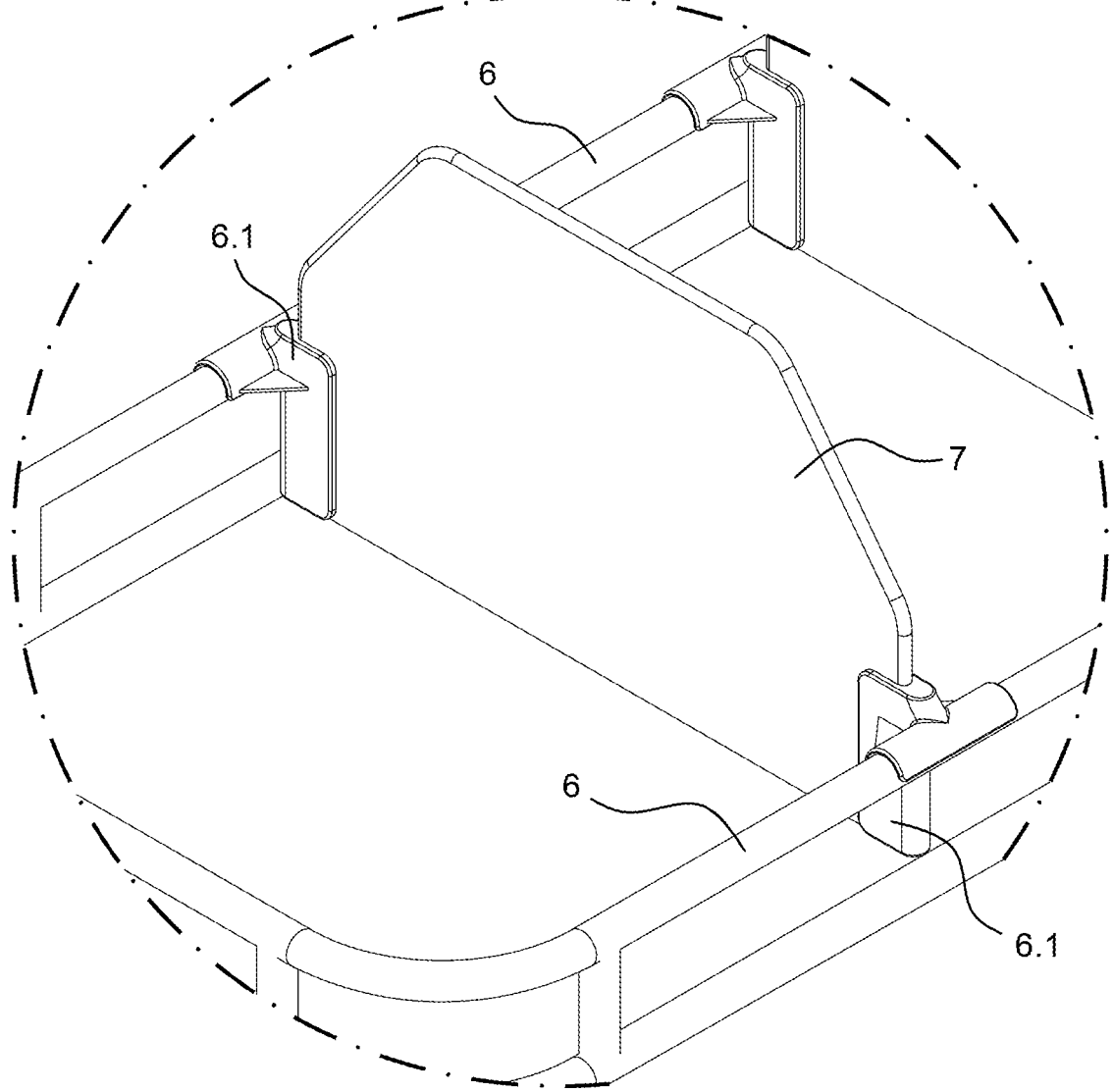
FIG. 5 is a detachable horizontal divider according to an aspect of the present technology.
Figure 6:
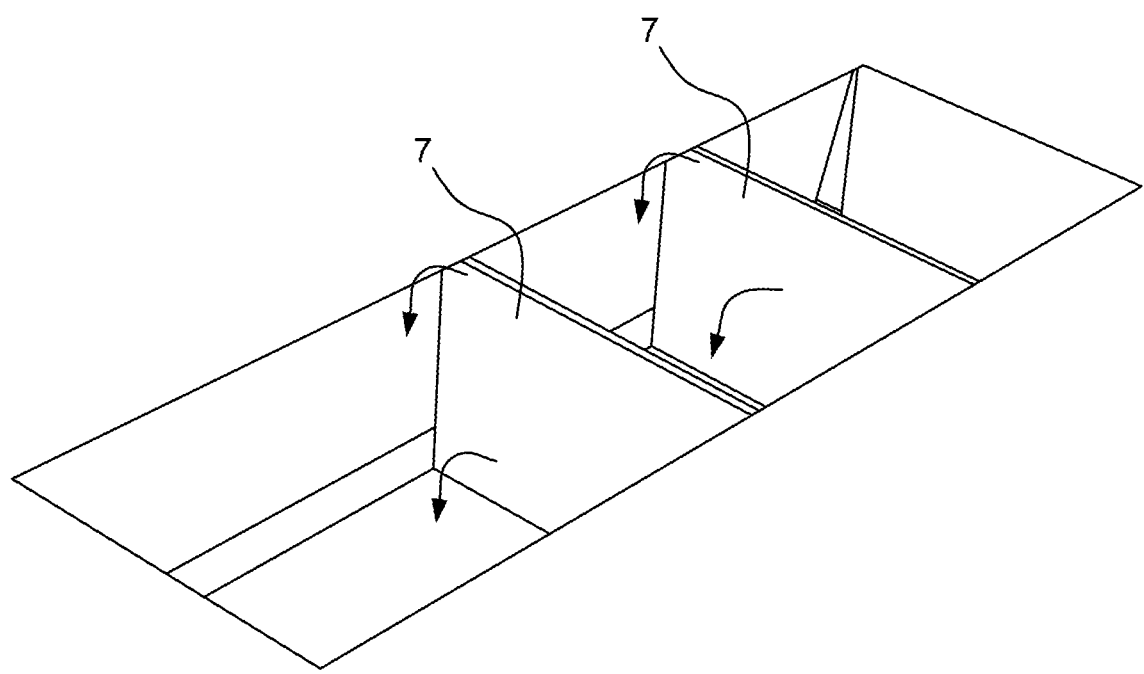
FIG. 6 is a collapsible horizontal divider according to an aspect of the present technology.

The system may include one or more horizontal dividers 7 that can detach (FIG. 5) or fold down when not in use (FIG. 6). As shown in FIG. 1, the shelf 1 and/or the rear and/or front parts of the restraining bar 6 may include one or more divider supports 6.1 (FIG. 5) that may include a slot to retain the dividers in the vertical position. In FIG. 6, the dividers 7 can be laid flat on the shelf 1 so the shelf 1, together with the dividers 7, can be moved to the stowed position. The shelf and the dividers may be formed in one piece (e.g., using a "living" hinge in the case of FIG. 6) or be integrally formed.

The position of the dividers 7 can be fixed or repositionable. For example, the divider supports 6.1 can be structured to slide along restraining bar 6.

Figure 13:
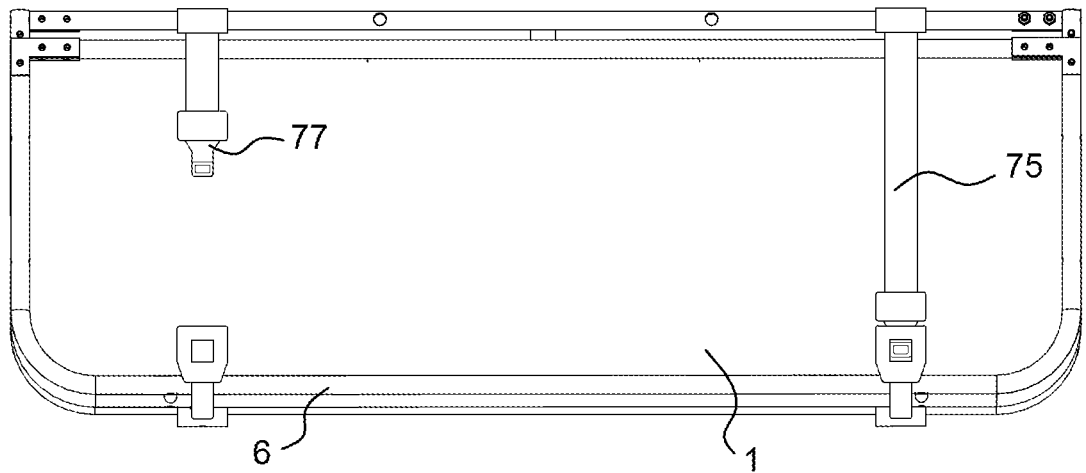
FIGS. 13-14 are top and perspective views of a belt divider according to aspects of the present technology.
Figure 14:
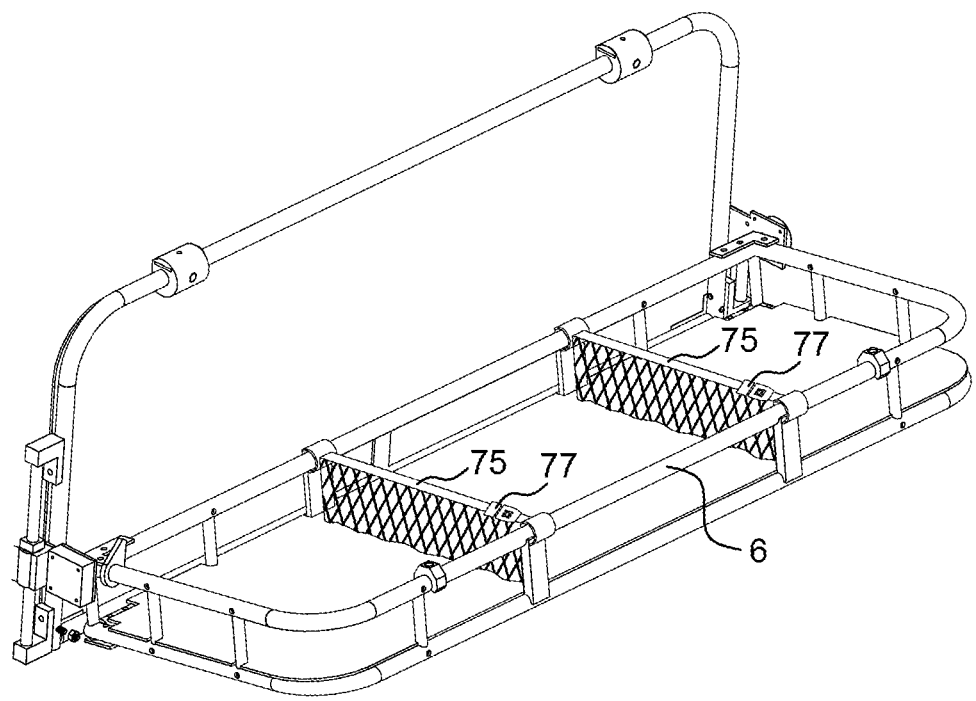

As seen in FIGS. 13 and 14, the dividers 75 may alternatively be in the form of a belt that stretches from the seat back to the front of the shelf 1. The belt dividers 75 may be like seat belts, extending from a retracted position to the front part of the restraining bar, attached with a clip 77 (like those used for seat belts). Some additional dividing material, such as nets 80, can be suspended from the belt dividers 75. Dividers 75 may be extendable if the shelf is pulled out to an extended position.

Another modification is that the dividers 75 may be attached to the top bar 11.1 in FIG. 14 (like the netting 20 in FIG. 7), instead of the rear 40 of the shelf 1. Attached in this manner, the belt can help to support the weight of the shelf in addition to providing a support function. Moreover, the belt can be extended or stretched so that it perform dividing and/or support functions even if the shelf 1 moves between the retracted and the extended positions (see, e.g., FIGS. 2A-2B). The belt is but one example of a stretchable and/or extendible support member which may optionally have a dividing function, e.g., the support member can be a rope, bungee, wire, etc. If the support member is also to perform a dividing function whilst attached to the top bar 11.1, the netting that hangs from the support members can have a triangular shape instead of the rectangular shape shown in FIGS. 13-14.

Securing System

A securing system attaches the shelf 1 to the vehicle's seat. For example, a belt system may include one or more belts, straps or cords 8 to secure the support structure 11 to the rear of the vehicle's seat, e.g., by a pair of headrest belts 8 that loop around the vehicle's headrests. One belt 8 is located towards the left side, and the other belt 8 is located towards the right side. The belts 8 for both sets are anchored on a top bar 11.1 of the system. The straps 8 loop around the metal support structure of the rearmost seating row headrests 8, and are connected via a buckle 16.1, 16.2 as shown in FIG. 3. The straps 8 are adjusted in length according to the size of the headrests on which they are fastened.

The straps may be fixed in place relative to the support structure 11, or they may be adjustable to compensate for varying distance between the headrests. Adjustability may be provided in a number of different ways, e.g., belts 8 may include one or more magnetic connectors that are attached to different lateral positions along the top bar 11.1. In addition or in the alternative, the top bar 11.1 may include a number of slots along its length in order to allow the user to select the appropriate slot that aligns with the headrests.

Another alternative is shown in FIG. 10, showing that belts 8 can simply be attached to the top bar 11.1 via collars or cuffs 30 that slide along the top bar 11.1 and may be fixed in place via one or more magnets, friction or a pin that is received within a hole or slot along the collar 30 and/or top bar 11.1.

The belt system may also include a central belt 9 that may be wrapped around the vehicle seat and connected, e.g., via a buckle 16.3 having a male part and a female part that are snapped together. Belt 9 is anchored at the top of the support structure 11, e.g. at top bar 11.1. The belt 9 loops vertically around the rearmost seating row, and secures the device flush against the backside of the seat 9. Strap 9 may be adjusted in length according to the size of the seatback on which it is fastened.

Belt 9 is positioned between the headrest straps 8. The system may also include additional features to maintain the support structure in abutment with the rear of the vehicle seat, such as hook and loop fasteners (to attach to seat backs that may be carpeted). In additional, certain vehicles have additional structures to which the support structure may be secured, e.g., small bar built in to the back of the seat.

The belts 8, 9 may be made of a lightweight and/or sturdy material, such as nylon. Polyester, acrylic and/or treated cotton.

Figure 8:
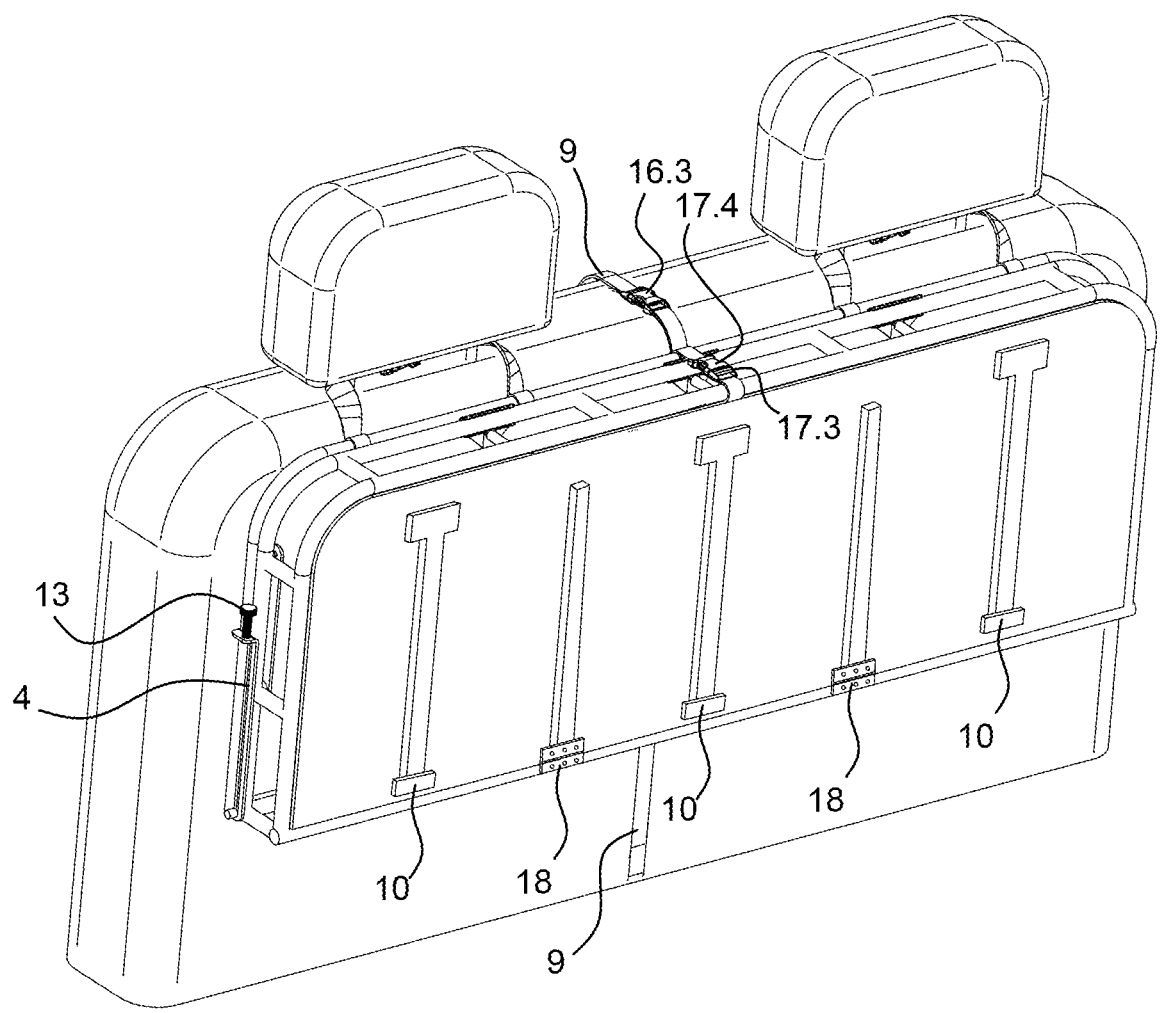
FIG. 8 is a perspective view of a track system according to an aspect of the present technology.
Figure 9:
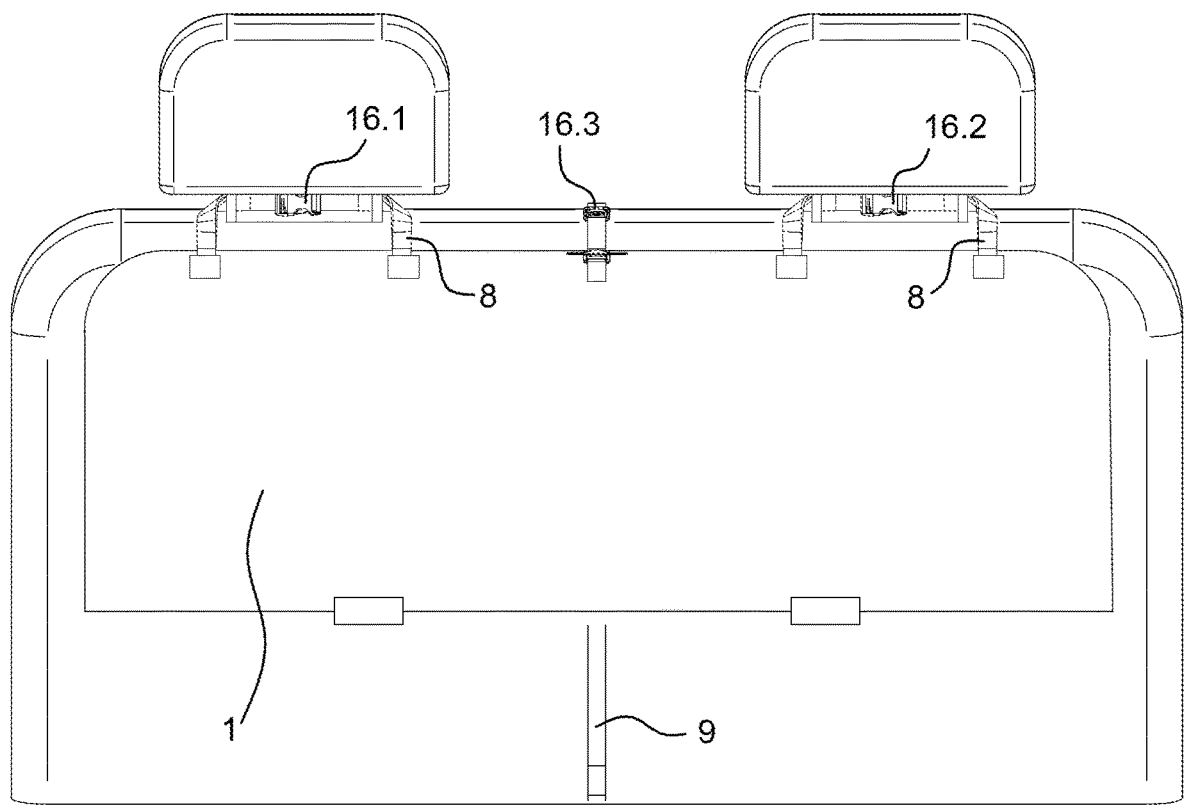
FIG. 9 is a frontal view of the trunk shelf system stowed according to an aspect of the present technology.

As shown in FIG. 8, the securing system may include a further belt 17.1 connected to the support structure 11 and another belt 17.2 connected to the shelf 1, e.g., on the retainer bar 6 or elsewhere. The belts 17.1, 17.2 are associated with buckle parts 17.3 and 17.4. As shown in FIG. 8, when the shelf 1 is in the stowed position, a male buckle part 17.3 is connected to female buckle part 17.4. When it is desired to move the shelf 1 to the deployed position, the buckle parts 17.3 and 17.4 are detached as shown in FIG. 1.

The belts 8, 9 17.1, 17.2 may be length adjustable, e.g., using hook and loop mechanisms or using ladder locks.

Alternatively, or in addition, the shelf 1 can be locked or secured into the stowed position via one or more magnets, a locking hinge or link, or a latch system. For example, as shown in FIG. 10, the shelf 1 may include one or more shelf magnets 32 that are intended to match the position of the collars 30. Thus, when the shelf 1 is raised to the stowed position, as shown in FIG. 11, the magnets 32 are attracted to the collars 30 (which may also be or include magnets). The magnets 32 may be configured to slide along the restraining bar 6, so as to allow the user to match the position of the collars 30.

Track System

The system may include a t system to allow users to move the shelf from a retracted position to an extended position closer to the opening of the trunk. As shown in FIG. 2, the shelf 1 may have a forward component 50 and a rearward component 52, where the forward component 50 may be pulled forward toward the trunk opening while the rearward component remains in place. The forward component 50 may be telescopically attached to the rearward component such that the retaining bar 6 is continuous whether the shelf 1 is in the extended or retracted position.

The shelf 1 may have a bottom portion with parts that are movable relative to one another to allow the support surface of the shelf to be expanded. For example, as shown in FIGS. 2A and 2B, the bottom portion may have a slidable bottom portion 54 associated with the first component. When the slidable portion is moved to the extended position, the slidable portion 54 creates additional horizontal storage space for the shelf 1. The second component is associated with a primary horizontal storage space 56. The first component and the second component may include stop members 58, 60 that together stop the first component 50 once it reaches its maximum extended position. In this example, the slidable bottom portion 54 is shown as nested within the shelf 1, but it could also be positioned above or below the storage space 56 and be deployed from that position, e.g., in a shingled fashion (from the top or the bottom). Moreover, the forward component 50 may include additional nested or shingled extensions so that the shelf can be extended even further towards the opening of the trunk, which is especially helpful for extra long SUV's.

In another example shown in FIG. 8, tracks 18 are provided on the left and right of the shelf's underside to allow users to pull the repositionable shelf forward to the opening of the trunk. The tracks 18 are attached at the base of the underside of the shelf 1. To disconnect the tracks from the static support structure, the user unlocks the locking pin P of the slot and pin mechanism on either side of the repositionable shelf. This is done by pulling upward on the locking pins on the left and right sides and disengaging the shelf from the slots and pin mechanism. The user also disconnects both links 3 from the shelf via release of a similar locking pin mechanism located on both links 3 connecting the repositionable shelf to the static structure 11. With both slots and pins mechanisms disengaged and both links disengaged, the repositionable shelf can glide forward along the tracks to the opening of the trunk.

Support Legs

FIG. 8 shows the system in the stowed position in which one or more collapsible and/or detachable telescoping legs 10 are attached to the shelf 1. For example, legs 10 are structured to provide additional support for very heavy items and/or when the shelf 1 is pulled forward via the track system 18. The legs 10 can be extended or positioned in the position as shown in FIG. 2, or the legs 10 can be folded or pivoted as shown in FIG. 8, allowing the user to stow the repositionable shelf flat against the seatback. Legs 10 may also be attached to the bottom of the first component 50 (or further extensions thereof) and/or the second component 52, as shown in FIGS. 2A and 2B.

Customizing

The repositionable shelf can be customized with a "skin," or design (name, label, sign, symbol, etc.) for the underside of the shelf with user's monogram, college or pro team logo, company name, etc. When stowed, the shelf prominently displays this logo or design 15. This same customizable skin or cover can be placed on the top of the shelf, too. When the detachable track system is in place to allow the shelf to move forward to the opening of the trunk, the top of the shelf's design or logo would be prominently displayed.

Different features, variations and multiple different examples have been shown and described with various details. What has been described in this application at times in terms of specific examples is done for illustrative purposes only and without the intent to limit or suggest that what has been conceived is only one particular example or specific examples. It is to be understood that this disclosure is not limited to any single specific examples or enumerated variations. Many modifications, variations and other examples will come to mind of those skilled in the art, and which are intended to be and are in fact covered by both this disclosure.

While the present technology has been described in connection with what is presently considered to be some practical and preferred examples, it is to be understood that the present technology is not to be limited to the disclosed examples, but on the contrary, is intended to cover various modifications and equivalent arrangements included within the spirit and scope of the disclosure.

The invention claimed is:

1. A trunk shelf system for mounting onto a seat back of a vehicle, the system comprising:
    a support structure configured to be secured to the seat back and accessible from a trunkspace of the vehicle, the support structure including a horizontal top bar and a pair of lateral arms extending vertically downward from each end of the top bar; and
    a shelf pivotably movable between a stowed position and a deployed position in the trunkspace, the shelf having a bottom surface providing a primary support surface for items to be stored, the shelf including a perimeter within which a support surface is formed, the shelf including a restraint extending vertically upwards from the primary support surface in the deployed position and configured to laterally support the items, the restraint extending continuously about the perimeter along a front, a rear, and each lateral side of the shelf, the shelf including a rear portion from which engaging members extend outside the perimeter, exterior to the restraint, each said engaging member being removably engaged with the support structure,
    wherein the shelf is movable to at least first and second different height positions relative to the support structure, and
    wherein the shelf is configured to span a distance from at least an outside edge of a first headrest of the seatback to at least an outside edge of a second headrest of the seatback.

2. The system of claim 1, wherein the shelf includes a first component that is slidable relative to a second component that is attached to the support structure, the first component being associated with a supplemental support surface.

3. The system of claim 2, wherein the first and second components are telescopically connected such that side rails on the shelf are continuous in the extended and retracted positions of the shelf.

4. The system of claim 2, wherein the first and second components include stops to limit movement of the first component to a maximum extended position.

5. The system of claim 2, further comprising at least one leg that is attached to the bottom of the first component, the leg being movable from a stowed position to a support position when the shelf is in the extended position.

6. The system of claim 2, wherein the first component includes a restraining bar having a grasping surface by which the user can pull the supplemental support surface out.

7. The system of claim 6, wherein the restraining bar is moveable between a lower position and an upper position.

8. The system of claim 2, wherein the supplemental support surface is positioned within the second component when the shelf is in the retracted position.

9. The system of claim 1, further comprising a stretchable/extendible support member extending from a top portion of the support structure to a front side of the shelf, the support structure being stretchable and/or extendible to support the shelf in both the retracted and extended positions.

10. The system of claim 1, wherein the height and the angle of the shelf are independently set.

11. The system of claim 1, further comprising a pair of straps extending from a top of the support structure to a distal end of the shelf, each of the straps being adjustable to allow movement of the shelf between the first and second height positions.

12. The system of claim 1, wherein each said engaging member engages a portion of a horizontally extending lower rail of the support structure.

13. The system of claim 1, wherein each said engaging member includes a spring.

14. The system of claim 1, wherein each said engaging member includes a spring loaded head.

15. The system of claim 1, wherein each said engaging member is deflectable.

16. A trunk shelf system for mounting onto a seat back of a vehicle, the system comprising:
- a support structure configured to be secured to the seat back and accessible from a trunkspace of the vehicle, the support structure including a horizontal top bar and a pair of lateral arms extending vertically downward from each end of the top bar, each of said pair of lateral arms including a bearing; and
- a shelf pivotably movable between a stowed position and a deployed position in the trunkspace, the shelf having a bottom surface providing a primary support surface for items to be stored, the shelf including a perimeter within which a support surface is formed, the shelf including a restraint extending vertically upwards from the primary support surface in the deployed position and configured to laterally support the items, the restraint extending continuously about the perimeter along a front, a rear, and each lateral side of the shelf, each lateral side of the shelf including an engaging member that extends outside the perimeter, exterior to the restraint, each said engaging member being rotatably supported by one said bearing,
- wherein the shelf is movable to at least first and second different height positions relative to the support structure, the first height position being lower than the second height position,
- wherein the shelf is configured to span a distance from at least an outside edge of a first headrest of the seatback to at least an outside edge of a second headrest of the seatback and
- wherein, when the shelf is in the stowed position at the first height position, an upper part of the restraint along a front of the shelf lies adjacent the top bar of the support structure.

17. The system of claim 16, further comprising cargo netting configured to extend over a top of the shelf and detachably hook onto the upper part of the restraint, to help secure the items.

18. The system of claim 16, wherein the height and the angle of the shelf are independently set.

19. The system of claim 16, further comprising a pair of straps extending from a top of the support structure to the shelf, each of the straps being adjustable to allow movement of the shelf between the first and second height positions.

20. The system of claim 16, wherein, when the shelf is in the stowed position at the first height, an upper part of the restraint along a front of the shelf is parallel to the top bar of the support structure, and lateral parts of the restraint are parallel to the lateral arms of the support structure.

21. The system of claim 16, wherein the shelf includes a first securing member and the support structure includes a second securing member configured to be detachably connected to the first securing member to hold the shelf in the stowed position, wherein the first and second securing members are buckle parts or magnets.

* * * * *